US012639263B2

(12) United States Patent (10) Patent No.: US 12,639,263 B2
Zhang (45) Date of Patent: May 26, 2026

(54) RETAINING DATA ACTIVITY TEMPERATURE FROM A CLOUD TO AN ON-PREMISES MULTI-TIER DATA STORAGE SYSTEM

(71) Applicant: DELL PRODUCTS L.P., Round Rock, TX (US)

(72) Inventor: Weibing Zhang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 18/793,388

(22) Filed: Aug. 2, 2024

(65) Prior Publication Data

US 2025/0384010 A1 Dec. 18, 2025

(30) Foreign Application Priority Data

Jun. 12, 2024 (CN) .......................... 202410752141.2

(51) Int. Cl.
| *G06F 16/10* | (2019.01) |
| *G06F 16/11* | (2019.01) |
| *G06F 16/13* | (2019.01) |
| *G06F 16/16* | (2019.01) |
| *G06F 16/21* | (2019.01) |
| *G06F 3/06* | (2006.01) |

(52) U.S. Cl.
CPC ............ *G06F 16/16* (2019.01); *G06F 16/119* (2019.01); *G06F 16/13* (2019.01); *G06F 16/214* (2019.01); *G06F 3/0611* (2013.01); *G06F 3/0614* (2013.01); *G06F 3/0685* (2013.01)

(58) Field of Classification Search
CPC ........ G06F 16/13; G06F 16/16; G06F 16/119; G06F 16/214; G06F 3/0611; G06F 3/0614; G06F 3/0685
See application file for complete search history.

(56) References Cited

U.S. PATENT DOCUMENTS

| 9,542,125 | B1 * | 1/2017 | Chen ...................... | G06F 3/0611 |
| 9,710,187 | B1 * | 7/2017 | Si ............................ | G06F 3/065 |
| 2012/0159097 | A1 * | 6/2012 | Jennas, II ............. | G06F 3/0619 |
| | | | | 711/E12.001 |
| 2015/0355837 | A1 * | 12/2015 | Bish ........................ | G06F 3/061 |
| | | | | 711/114 |
| 2017/0003889 | A1 * | 1/2017 | Kim ...................... | G06F 3/0659 |
| 2018/0157655 | A1 * | 6/2018 | Dain ...................... | G06F 16/119 |
| 2018/0314449 | A1 * | 11/2018 | Kondapalli ........... | G06F 3/0631 |

(Continued)

FOREIGN PATENT DOCUMENTS

WO WO-2015154352 A1 * 10/2015 ............ G06F 16/119

OTHER PUBLICATIONS

English translation of WO 2015154352 A1 (Year: 2015).*

*Primary Examiner* — Diedra McQuitery
(74) *Attorney, Agent, or Firm* — Larson Newman, LLP

(57) ABSTRACT
An information handling system determines a data activity temperature of an object for migration from a remote data storage to an on-premises data storage. The system also determines a category for the object based on the data activity temperature. In addition, the system determines temperatures of a plurality of tiers of the on-premises data storage and migrates a file associated with the object from the remote data storage to a tier of the tiers of the on-premises data storage based on the data activity temperature of the object.

20 Claims, 5 Drawing Sheets

(56) References Cited

U.S. PATENT DOCUMENTS

| 2019/0369897 A1* | 12/2019 | Zhou | G06F 3/0608 |
| 2024/0037069 A1 | 2/2024 | Mathew et al. | |
| 2024/0111429 A1 | 4/2024 | Vankamamidi et al. | |

* cited by examiner

200

RETAINING DATA ACTIVITY TEMPERATURE FROM A CLOUD TO AN ON-PREMISES MULTI-TIER DATA STORAGE SYSTEM

FIELD OF THE DISCLOSURE

The present disclosure generally relates to information handling systems, and more particularly relates to retaining data activity temperature from a cloud to an on-premises multi-tier data storage system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system determines a data activity temperature of an object for migration from a remote data storage to an on-premises data storage. The system also determines a category for the object based on the data activity temperature. In addition, the system determines temperatures of a plurality of tiers of the on-premises data storage and migrates a file associated with the object from the remote data storage to a tier of the tiers of the on-premises data storage based on the data activity temperature of the object.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Cloud computing allows users and/or enterprises to store and process their data in either a private cloud data storage or a public cloud data storage, such as a third-party cloud-owned data storage. Large-scale cloud computing infrastructure and services are often provided by cloud providers that maintain data centers that may be located long distances from many of the users. For example, a cloud data storage system may be used for large-scale data backup operations by enterprises that process large amounts of data regularly. The cloud data storage system may use an automated data tiering process to store data based on its data activity temperature. This may be performed to improve input/output (I/O) performance of one or more user applications. For example, a cloud multiple-tier storage system may store data classified as hot data in a higher data storage tier while data classified as cold data may be stored in a lower data storage tier. For simplicity, data storage tiers may also be referred to herein as tiers.

During data migration from the cloud multiple-tier data storage system to an on-premises multiple-tier data storage system, the data is typically stored without considering its data activity temperature. Accordingly, the on-premises multiple-tier data storage system may store the hot data and the cold data in the same tier. Subsequent to the data migration, the on-premises multiple-tier data storage system may then relocate the data to a different tier, which can be time-consuming and involves multiple reads and writes as the data hops from one tier to another tier. Accordingly, this may cause wear on storage drives, which can shorten the lifespan of the storage drives. For enterprises that migrate a large amount of data frequently, this can be an issue. Accordingly, the present disclosure provides a data migration process that can automatically store the migrated data to its corresponding tier. As such, relocating the migrated data can be avoided, which can then in turn increase the lifespan of the storage drives.

Figure 1:
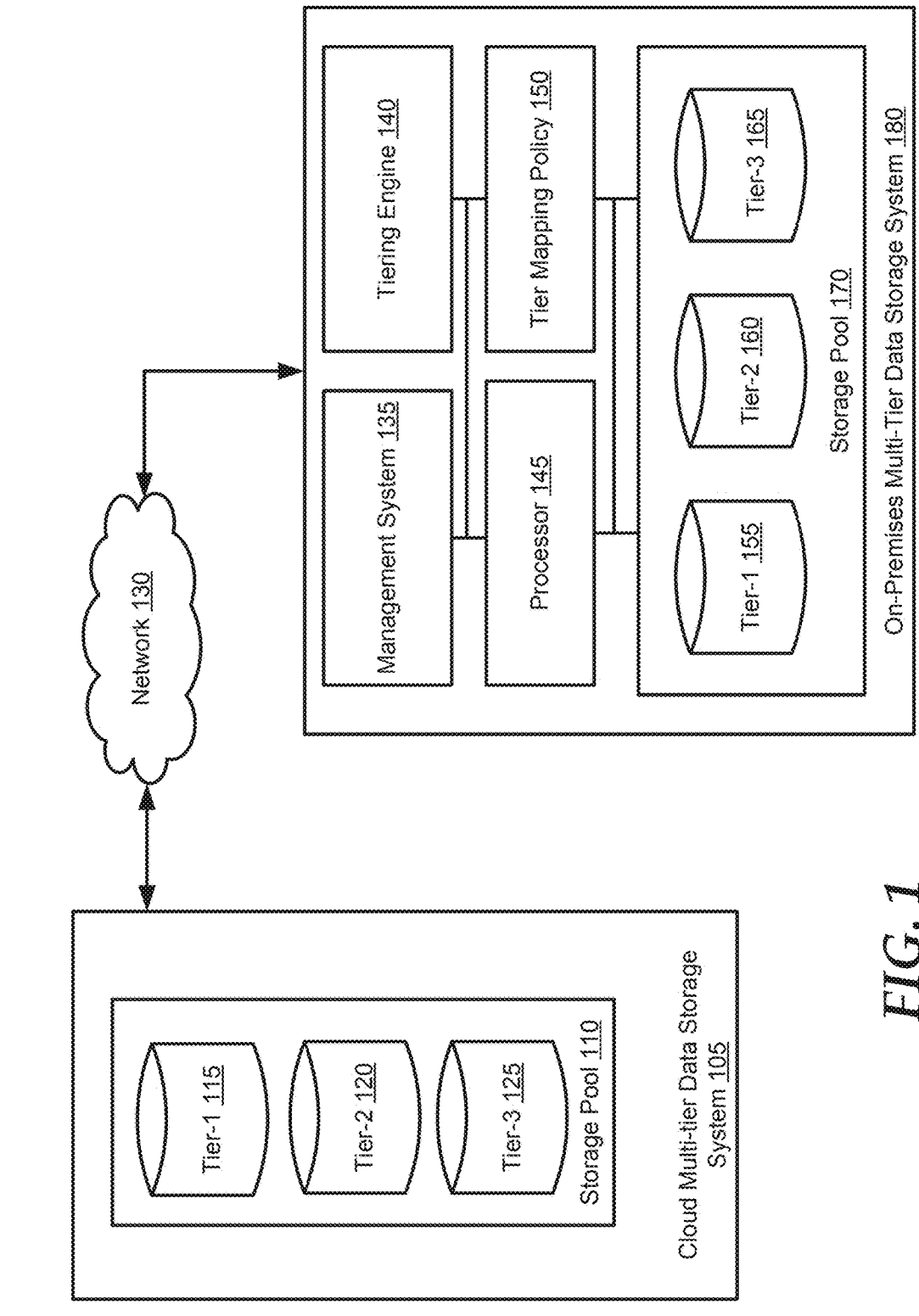
FIG. 1 is a block diagram of a multi-tier storage system for retaining data activity temperature from a cloud to an on-premises multi-tier data storage system, according to an embodiment of the present disclosure.

FIG. 1 shows a portion of a multi-tier data storage system 100, according to at least one embodiment of the present disclosure. Multi-tier data storage system 100 includes a cloud multi-tier data storage system 105, a network 130, and an on-premises multi-tier data storage system 180. Cloud multi-tier data storage system 105 may be located remotely from on-premises multi-tier data storage system 180 and communicatively coupled to on-premises multi-tier data storage system 180 via network 130. Cloud multi-tier data storage system 105 includes a storage pool 170 which includes different data storage tiers, such as a tier-1 115, a tier-2, 120, and a tier-3 125. On-premises multi-tier data storage system 180 includes a management system 135, a tiering engine 140, a storage pool 170, a processor 145, and a tier mapping policy 150. Storage pool 170 includes different data storage tiers, such as a tier-1 155, a tier-2 160, and a tier-3 165. Storage pool 170 is communicatively coupled to management system 135, tiering engine 140, processor 145, and tier mapping policy 150. However, any variety of connections between storage pool 170 and management system 135, tiering engine 140, processor 145, and/or tier mapping policy 150 are envisioned as falling within the scope of the present disclosure. Additionally, components of multi-tier data storage system 100 can communicate using any suitable technique described herein for exemplary purposes.

Cloud multi-tier data storage system 105, also referred to herein simply as storage system 105, may be provided by a third-party cloud service provider, such as Amazon™ among others. Storage system 105 may refer to a network or cloud-implemented storage solution that is typically used to store data. Each object includes a key, a version identifier, a value, and metadata. The key along with the version identifier may be used to uniquely identify the object. The value refers to content being stored, such as data or a file. The file can be of various types, such as an image, backup, movie, etc. When a user uploads a file for storage, the cloud multi-tier data storage system typically stores the file as an object. The metadata refers to information associated with the object and/or the content. For example, the metadata may include tier information, such as which tier the data is stored. The tier information may also include data activity temperature, which may refer to a measure of read/write or access of the data. The data activity temperature may indicate frequency of the read/write access, wherein hot data refers to data that is frequently accessed or in high demand and cold data refers to data that is infrequently accessed or in low demand. Examples of hot data include in-memory caches and frequently used data bases. Accordingly, the more the data is accessed, the hotter that data is.

Storage system 105 may impose costs in terms of provider fees and/or resource overhead to access the stored data. Storage system 105 may automatically perform data tiering based on one or more factors, such as user access patterns, cost, data activity temperature, and minimum storage durations. In one example, the data activity temperature may be classified as hot, warm, or cold, wherein hot may be attributed to frequently accessed data, while warm may be attributed to less frequently accessed data, and cold may be attributed to data that has not been accessed for a certain period. Thus, data classified as hot may require a faster response time than the data classified as warm or cold. The data classified as cold may require the slowest response time than the data classified as hot or warm.

Each tier may include different types of storage media, such as based on performance and capacity. For example, tier-1 115 may include solid-state drive (SSD) storage drives as they are fast while tier-2 120 and tier-3 125 may include hard disk drive (HDD) storage drives as they are slower. Accordingly, tier-1 115 may be used as storage for frequently accessed data, and tier-2 120 may be used less frequently accessed data, such as data not accessed for months up to a year. Tier-3 125 may be used for data not accessed in years. As such, tier-1 115 may also be referred to as an active tier, tier-2 120 may be referred to as an archive tier, and tier-3 125 may be referred to as a deep archive tier. Storage system 105 may monitor user access patterns and automatically move objects that have not been accessed for a certain period from the active tier to the archive tier or the deep archive tier. For example, storage system 105 may move objects from tier-1 115 to tier-2 120 if the objects have not been accessed for 30 consecutive days.

On-premises multi-tier data storage system 180, also referred to herein simply as storage system 180, may represent any privately owned and maintained enterprise multi-tier data storage environment. On-premises multi-tier data storage system 180 may include any number and any configuration of physical servers, storage systems, and/or other subsystems. Any subset of storage system 180 may be implemented using computing systems similar to information handling system 500 of FIG. 5. Storage system 180 may be configured with a tier storage architecture that categorizes data hierarchically based on one or more attributes, such as data activity temperature and response time. Different data storage tiers may be used to provide a unified data storage pool for storing data blocks. In addition, storage system 180 may be implemented in two layers, such as an upper deck and a lower deck. This is performed so that if there is data relocation, then the upper deck may not impact the upper deck layer file system orchestration.

Management system 135 may be configured to manage and monitor storage system 180. For example, management system 135 may be used to view information about a current data storage configuration, such as at a display device. The data storage configuration information generally describes the various physical and logical entities in the current data storage system configuration, such as available storage capacity, used storage capacity, performance information, and data activity temperature of objects stored in the storage system among others.

There may be times when data stored in storage system 105 are transferred or migrated to storage system 180. Before the data migration starts, tiering engine 140 may be configured to query storage system 105 for tier information that includes data activity temperature before the data migration from storage system 105 to storage system 180 starts. Tiering engine 140 may categorize the objects according to the tier information. Then the objects may be migrated in sequence according to their categories to match a data migration policy of storage system 180. For example, the objects from tier-1 115 may be migrated first, then the objects from tier-2 120, and finally the objects from tier-3 125. The migration sequence may also be based on other factors including the object's tier information. For example, the migration sequence may be according to the data activity temperature.

Tiering engine 140 may be configured to determine where to place the data from storage system 105 according to category and/or business requirements. For example, tiering engine 140 may monitor temperature-per-block (TPB) and/or slice temperature for each slice within storage pool 170 prior to and/or during the data migration. Tiering engine 140 may dynamically match the performance requirements of the data with tiers with storage drives that provide that level of performance among other factors. As such, when transferring a file from storage system 105 to storage system 180, the selection of which tier to store the file may be based on the data activity temperature and/or the TPB. Accordingly, tiering engine 140 may also use the tier information and the data activity temperature information to rebuild data in storage pool 170 if a user, such as an administrator, chooses to perform tiering-aware data migration and retain the tier information associated with the objects being migrated.

Further, a tier mapping policy, such as a tier mapping policy 150, may be used during the data migration for the tier selection. The tier mapping policy may map a particular tier in a cloud multi-tier data storage system to a specific tier in an on-premises multi-tier data storage system. For example, tiering engine 140 may use tier mapping policy 150 to map a particular tier in storage system 105 to a specific tier in storage system 180. In a particular example, tier-1 115 may be mapped to tier-1 155 while tier-2 120 may be mapped to tier-2 160, and tier-3 125 may be mapped to tier-3 165. As such, objects in tier-1 115 may be stored in tier-1 155 while objects in tier-2 may be stored in tier-2 160 and objects in tier-3 125 may be stored in tier-3 165. This allows for cloud object storage consistency across the cloud multi-tier data storage system and the on-premises multi-tier data storage system.

In addition, as the data activity temperature is rebuilt during the data migration, unnecessary data relocation may also be avoided which can reduce data wear in flash tiers. However, the mapping may not be one-to-one, because there could be a different number of tiers in the cloud multi-tier data storage system than the on-premises multi-tier data storage system. As such, tier mapping policy 150 may map one tier in storage system 105 to at least two tiers in storage system 180. Similarly, tier mapping policy 150 may map at least two tiers in storage system 105 to one tier in storage system 180. After the data migration, the TPB and/or a current slice temperature of each of the storage slices may be determined. The TPB and/or slice temperatures may be accumulated and used for a next data migration.

Storage pool 170 provides different tiers of storage, wherein each tier may represent a different category. In this example, storage pool 170 includes a tier-1 155, a tier-2 160, and a tier-3 165, wherein tier-1 155 may be categorized as high tier while tier-2 160 as middle tier, and tier-3 165 as low tier. In one embodiment, tier-1 155 may be used to store frequently accessed data, while tier-2 160 may be used to store less frequently accessed data and tier-3 165 may be used to store data that has not been accessed for a certain period, such as at least a year. To accommodate performance requirements of the data, each tier may be comprised of different storage drive types. In one example, tier-1 155 may be comprised of flash drives, tier-2 160 may be comprised of SAS drives, and tier-3 165 may be comprised of NL-SAS drives. In one embodiment each tier may be used to store data according to one or more attributes, such as the data activity temperature.

The operations described herein as being performed by management system 135 or tiering engine 140 may be performed or executed by processor 145, which is similar to processors 502 and 504 of FIG. 500. Similarly, processor 145 may perform any suitable operations to execute management system 135 and tiering engine 140.

Network 130 may be implemented as or maybe a part of, a storage area network (SAN), a personal area network (PAN), a local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data and/or messages. Network 130 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS), or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 130 and its various components may be implemented using hardware, software, or any combination thereof. These components may be configured to facilitate communication between cloud multi-tier data storage system 105 and on-premises multi-tier data storage system 180.

Those of ordinary skill in the art will appreciate that the configuration, hardware, and/or software components of multi-tier data storage system 100 depicted in FIG. 1 may vary. For example, the illustrative components within multi-tier data storage system 100 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 2:
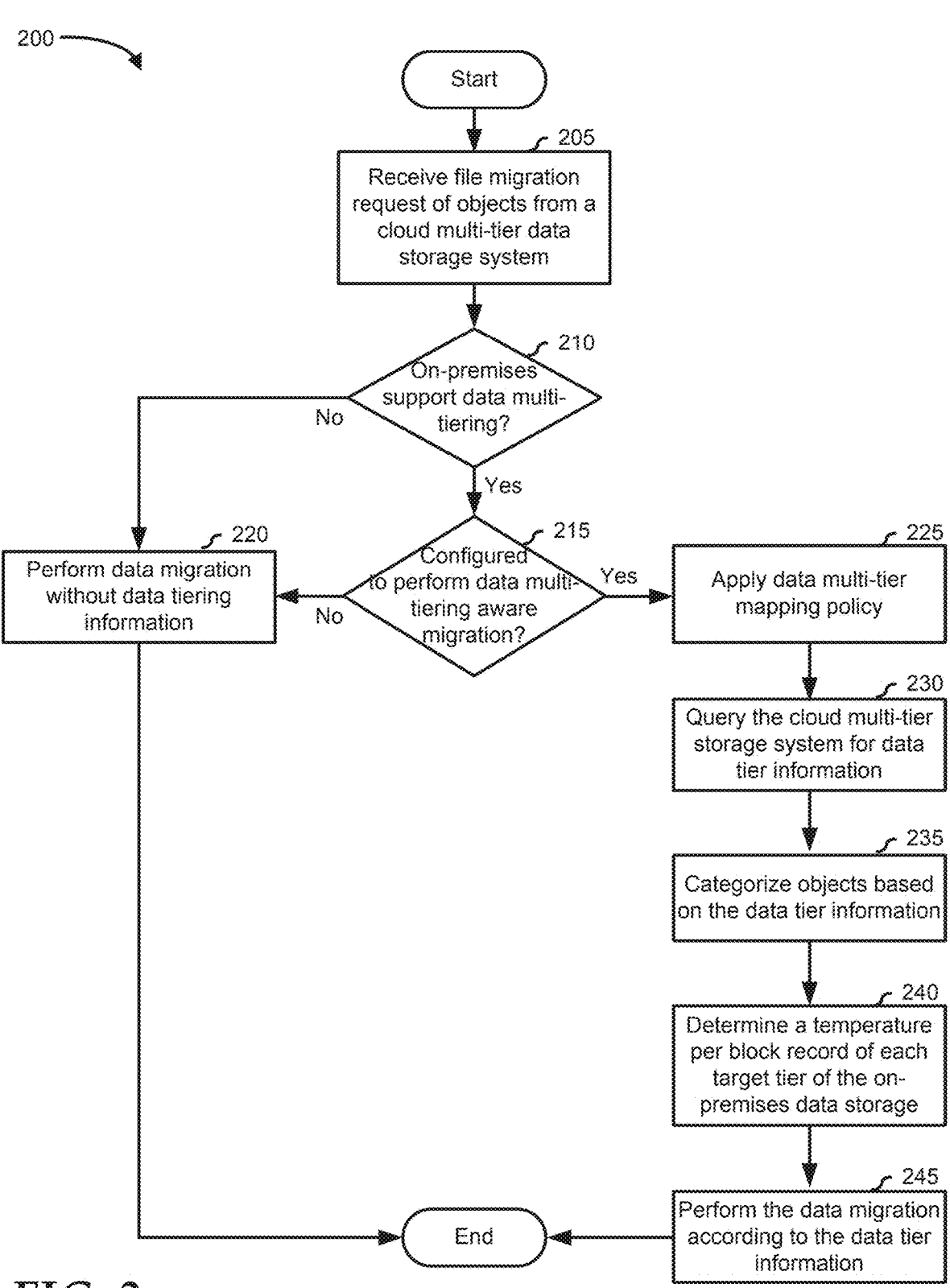
FIG. 2 is a flowchart of a method for retaining data activity temperature from a cloud to an on-premises multi-tier data storage system, according to an embodiment of the present disclosure.

FIG. 2 shows a flowchart for a method 200 for retaining data activity temperature from a cloud to an on-premises multi-tier data storage system. Method 200 may be performed by any suitable component of multi-tier data storage system 100 of FIG. 1. While embodiments of the present disclosure are described in terms of the components of multi-tier data storage system 100 of FIG. 1, it should be recognized that other components may be utilized to perform the described method. For example, method 200 may be performed by any suitable component including, but not limited to, management system 135 and/or tiering engine 140 of FIG. 1. One of skill in the art will appreciate that this flowchart explains a typical example, which can be extended to applications or services in practice.

Method 200 typically starts at block 205 where an on-premises multi-tier data storage system receives or initiates a data migration from a cloud-based multi-tier data storage system, such as storage system 105 of FIG. 1. The data migration may migrate objects, data, or files. The data migration may be initiated or requested via management system 135 of FIG. 1. However, a cloud multi-tier data storage system may also initiate the data migration. Method 200 may proceed to decision block 210 where a tiering engine may determine whether the on-premises multi-tier data storage system provides data multi-tiering support. If the on-premises multi-tier data storage system provides data multi-tiering support, then the "YES" branch is taken, and the method may proceed to decision block 215. If the on-premises multi-tier data storage system does not provide data multi-tiering support, then the "NO" branch is taken, and the method may proceed to block 220.

At decision block 215, the tiering engine may determine whether the on-premises multi-tier data storage system is configured to perform a data multi-tiering aware migration. If the on-premises multi-tier data storage system can perform a data multi-tiering aware migration, then the "YES" branch is taken, and the method proceeds to block 225. If the on-premises multi-tier data storage system cannot perform a data multi-tiering aware migration, then the method proceeds to block 220.

At block 220, the on-premises multi-tier data storage system may perform the data migration without tier information. At block 225, the on-premises multi-tier data storage system may apply one or more data multi-tier mapping policies. For example, the tiering engine may select one or more data multi-tier mapping policies to be applied based on one or more factors, such as the object, data type, or file type to be migrated. The method may proceed to block 230, wherein the on-premises multi-tier data storage system may query the cloud multi-tier data storage system for the tier information. The tier information can be obtained as an object attribute or metadata. For example, the tiering engine may query the cloud-multitier data storage for the tier information using an application programming interface for each object, data, or file to be migrated.

The method proceeds to block 235, where the on-premises multi-tier data storage system may categorize the objects, data, or files based on the tier information. In particular, the tiering engine may process the object, data, or files received during the data migration into categories called tiers based on one or more object attributes, such as the data activity temperature, wherein the data activity temperature may indicate frequency of the read/write access. The data activity temperature may also indicate archive status of the data. For example, frequently accessed data may be referred to as hot data or active data while less frequently accessed data may be referred to as warm data or archive data and cold data may be referred to as deep archive data. If the on-premises multi-tier data storage system includes three tiers, then the tiering engine may categorize the objects, data, or files received into three different groups based on the tier information. For example, the objects, data, or files may be categorized into different groups based on "Archive Status." In one embodiment, the objects, data, or files may be categorized into a low-tier group, a middle-tier group, and a high-tier group.

For example, the object with an archive status of "DEEP-_ARCHIVE_ACCESS" may be categorized into a low-tier group while objects with an archive status of "ARCHIVE-_ACCESS" may be categorized into a middle-tier group. Other objects with a different archive status or with an unknown archive status may be categorized into a high-tier group. The data migration sequence may be performed based on these categories according to one or more data migration policies. For example, the objects, data, or files may be migrated according to a sequence of high tier, medium tier, and then to low tier. The data migration sequence may be changed if a different data migration policy is used or if the data migration policy is updated.

The method proceeds to block 240, the on-premises multi-tier data storage system may determine an average TPB of each target tier for storage. The average TPB may be based on the temperature per data region, also referred to as storage slice or simply slice, for each data block. For each slice, the TPB may be calculated using an equation below.

$$TPB = \frac{Temperature_{Slice}}{Block\_count\_in\_slice}$$

An average TPB for data blocks in a given tier may be calculated based on an equation below.

$$avg(TPB)_{tier\_type} = \frac{\sum_{i=0}^{n} Slice\_Temperature_i}{\sum_{i=0}^{n} Block\_Count\_In\_Slice_i},$$

where $i$ is each slice in the tier

Accordingly, several average TPB values for each tier may be calculated, such as $avg(TPB)_{extreme}$, $avg(TPB)_{performance}$, $avg(TPB)_{capacity}$. For example, $avg(TPB)_{extreme}$ maybe the average TPB for tier-1 155 of FIG. 1 while $avg(TPB)_{performance}$ maybe the average TPB for tier-2 160 of FIG. 1 and $avg(TPB)_{capacity}$ may be the average TPB for tier-3 165 of FIG. 1.

The method proceeds to block 245, where the on-premises multi-tier data storage system may perform the data migration according to the selected one or more data migration policies. The data migration policies may map the location where the migrated data may be stored on the on-premises data storage system based on the tier information. For example, the data migration may be based on the data activity temperature. In particular, the objects, data, or files from the high-tier category may be stored in a particular tier, such as tier-1 155 of FIG. 1 while those from the middle-tier category may be stored in another tier, such as tier-2 160 of FIG. 1, and those from the low tier category may be stored in a different tier, such as tier-3 165 of FIG. 1.

During the data migration, as data blocks of the objects, data, or files may be written to one or more target slices of a corresponding tier, a change in temperature also referred to as a delta temperature, of the one or more target slices may be accumulated based on a following equation.

$$\Delta T_{mig} = \sum_{j=0}^{m} avg(TPB_j)_{tier_{type}},$$

where $j$ refers to data blocks written to the target slice

The temperature of the target slices may change based on the data activity temperature of the objects, data, or files being written to the target slices. For example, the temperature of the target slices may get hotter if the objects, data, or files being written to are hotter than the objects, data, or files currently stored in the target slices. The data may be hotter if it is accessed more frequently in comparison with other hot data. The delta temperature may be added to metadata associated with one or more target slices as the data block is being written. During the next cloud data migration to the on-premises multi-tier data storage system, the change in the temperature of the target data slices may be accounted for. Accordingly, the temperature of the target slice may be calculated using an equation below.

$$T = T' * \alpha + \Delta T_{io} + \Delta T_{mig}$$

The newly calculated slice temperature from migration is: $\Delta T_{mig}$: where the slice temperature gained from a migration between previous a sampling time and a current sampling time With the above equation, the data activity temperature associated with the objects being migrated may be propagated into the slice temperature. The data activity temperature may be translated first to one that the on-premises multi-tier data storage system can understand.

The data migration may be performed according to a sequence, such as from one category to another category. For example, objects, data, or files from the high-tier category may be migrated first, followed by those from the middle-tier category then those from the low-tier category. The object, data, or file could also be redirected to a sibling tier when there is not enough space in the target tier. An administrator may change and/or customize the data migration policy before or during the data migration.

Figure 3:
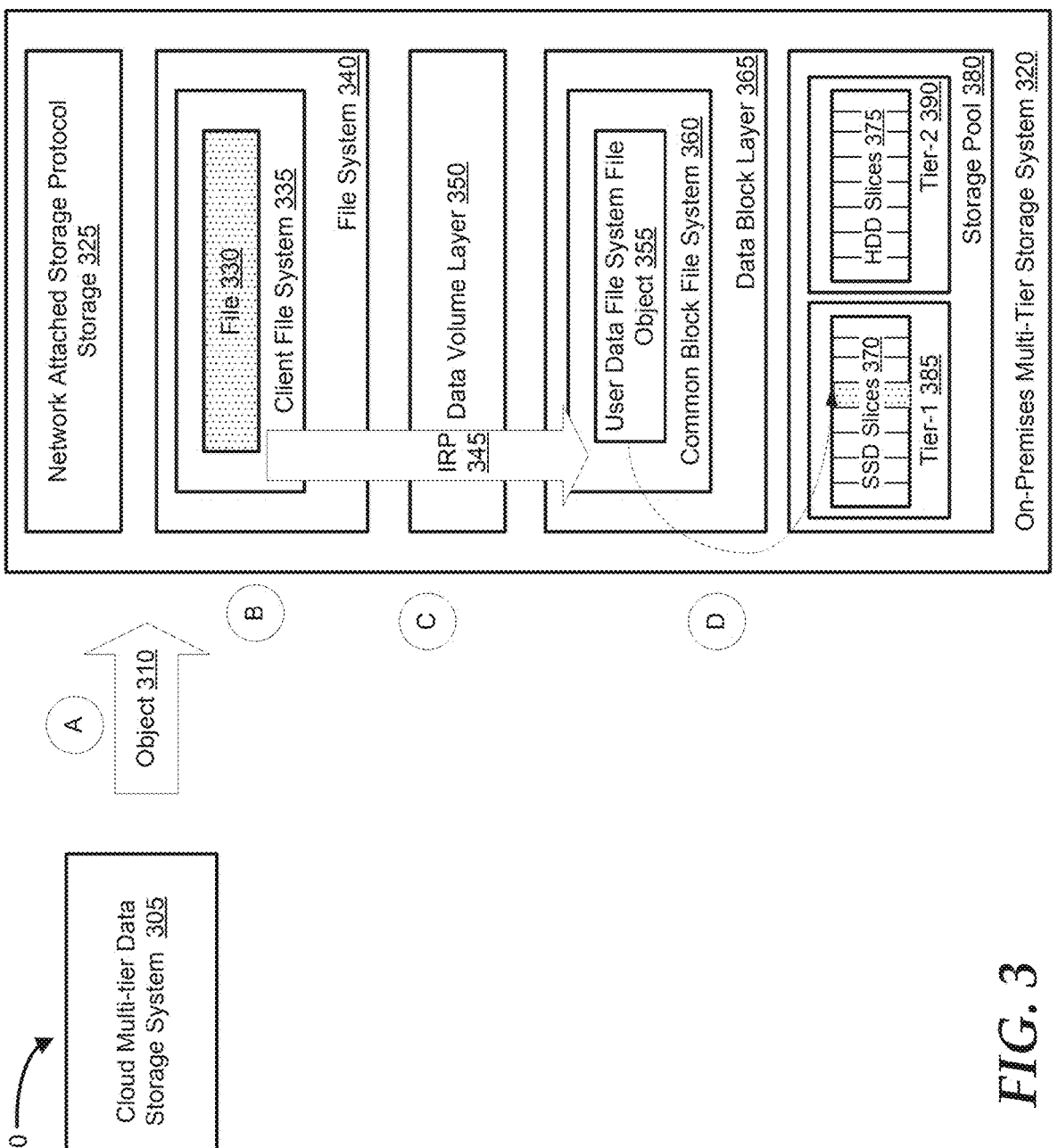
FIGS. 3-4 are block diagrams of a multi-tier storage system for retaining data activity temperature from a cloud to an on-premises multi-tier data storage system, according to an embodiment of the present disclosure.

FIG. 3 shows a portion of a multi-tier data storage system 300, according to one embodiment. In particular, this diagram shows how an object is transferred from a cloud multi-tier data storage system to an on-premises multi-tier data storage system. FIG. 3 is annotated with a series of letters A-D. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, object 310 may be migrated from a cloud multi-tier data storage system 305 to an on-premises multi-tier data storage system 320 using a network-attached storage protocol 325, such as a network file system protocol or a common internet file system protocol. Cloud multi-tier data storage system 305 may be similar to cloud multi-tier data storage system 105 of FIG. 1. On-premises multi-tier data storage system 320, which is similar to on-premises multi-tier data storage system 180 of FIG. 1, includes a file system 340, a data volume layer 350, a data block layer 365, and a storage pool 380. Storage pool 380 may be similar to storage pool 170 of FIG. 1. Storage pool 380 includes tier-1 385 and tier-2 390. Tier-1 385 may be similar to tier-1 155 of FIG. 1 while tier-2 390 may be similar to tier-2 160 of FIG. 1. Tier-1 385 may be comprised of one or more SSDs while tier-2 390 may be comprised of one or more HDDs. Each of the SSDs may be partitioned into SSD slices 370 while each of the HDDs may be partitioned into HDD slices 375.

At stage B, upon receipt of object 310, a file 330, which is included in object 310, may be stored in a client file system 335, also referred to as an upper deck. At stage C, file 330 may be moved and stored to common block file system 360 at data block layer 365, also referred to as a lower deck. File 330 may be stored as a user data file system (UDFS) file object 355 via I/O request packet 345 through data volume layer 350. At stage D, a tiering engine, similar to tiering engine 140 of FIG. 1, may move and store UDFS file object 355 in one or more slices of SSD slices 370. Because object 310 may be an object from a "frequent access" tier of cloud multi-tier data storage system 305, object 310 may be written to a corresponding tier in the on-premises multi-tier data storage system according to a data migration policy. In this example, because SSD slices 370 may be accessed faster than HDD slices 375, SSD slices 370 may be part of a tier that corresponds to the frequent access tier of cloud multi-tier data storage system 305 whereas HDD slices 375 may be used as storage for data that are access less frequently.

Figure 4:
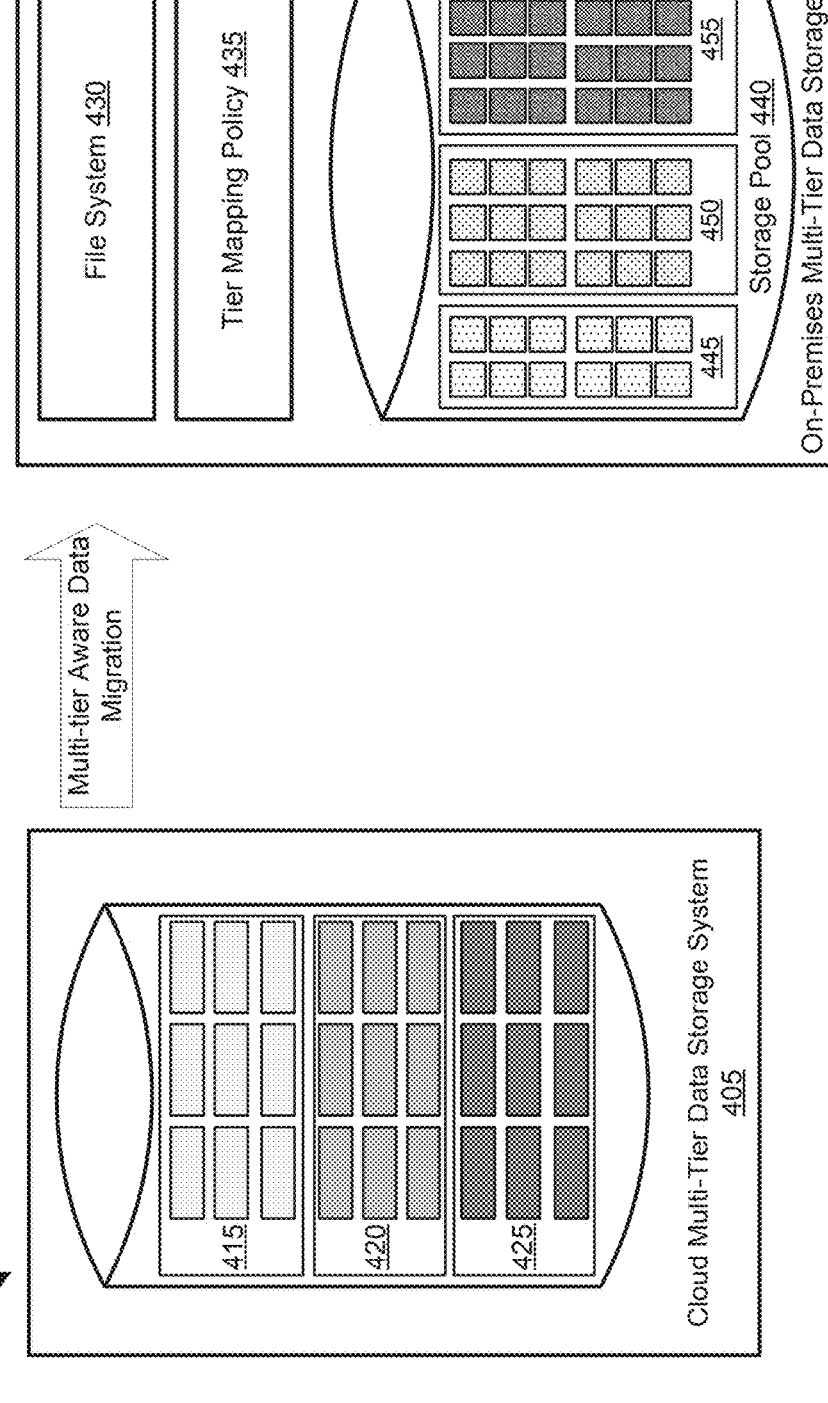

FIG. 4 shows a portion of a multi-tier data storage system 400, according to one embodiment. In particular, this diagram shows a mapping of tiers in cloud multi-tier data storage system 405 to on-premises multi-tier data storage system 460. Multi-tier data storage system 400 includes a cloud multi-tier data storage system 405 and an on-premises multi-tier data storage system 460. Cloud multi-tier data storage system 405, which is similar to cloud multi-tier data storage system 105 of FIG. 1, includes tiers 415, 420, and 425. Tier 415 is similar to tier-1 115, tier 420 is similar to tier-2 120, and tier 425 is similar to tier-3 125. On-premises multi-tier data storage system 460, which is similar to on-premises multi-tier data storage system 180, includes a file system 430, a tier mapping layer 435, and a storage pool 440. Tier mapping layer 435 may include one or more tier mapping policies, such as tier mapping policy 150 of FIG. 1. Storage pool 440, which is similar to storage pool 170 of FIG. 1, includes tiers 445, 450, and 425. Tier 445 is similar to tier-1 155 of FIG. 1, tier 450 is similar to tier-2 160 of FIG. 1, and tier 455 is similar to tier-3 165 of FIG. 1.

During a multi-tier aware data migration between cloud multi-tier data storage system 405 and on-premises multi-tier data storage system 460, the content of objects being migrated may be stored in file system 430 prior to its transfer to one of tiers 445, 450, or 455 in storage pool 440. A tiering engine may determine which one of tiers 445, 450, or 455 to store the content based on a tier mapping policy in tier mapping layer 435. In this example, the tier mapping policy may map tier 415 to tier 445, tier 420 to tier 450, and tier 425 to tier 455. Accordingly, content of objects in tier 415 may be stored in tier 445 while content of objects in tier 420 may be stored in tier 450, and content of objects in tier 425 may be stored in tier 455.

Figure 5:
FIG. 5 is a block diagram illustrating an information handling system according to an embodiment of the present disclosure.
Figure 5:

FIG. 5 illustrates an embodiment of an information handling system 500 including processors 502 and 504, a chipset 510, a memory 520, a graphics adapter 530 connected to a video display 534, a non-volatile RAM (NVRAM) 540 that includes a basic input and output system/extensible firmware interface (BIOS/EFI) module 542, a disk controller 550, a hard disk drive (HDD) 554, an optical disk drive 556, a disk emulator 560 connected to an SSD 564, an I/O interface 570 connected to an add-on resource 574 and a trusted platform module (TPM) 576, a network interface 580, and a baseboard management controller (BMC) 590. Processor 502 is connected to chipset 510 via processor interface 506, and processor 504 is connected to the chipset via processor interface 508. In a particular embodiment, processors 502 and 504 are connected together via a high-capacity coherent fabric, such as a HyperTransport link, a QuickPath Interconnect, or the like. Chipset 510 represents an integrated circuit or group of integrated circuits that manage the data flow between processors 502 and 504 and the other elements of information handling system 500. In a particular embodiment, chipset 510 represents a pair of integrated circuits, such as a northbridge component and a southbridge component. In another embodiment, some or all of the functions and features of chipset 510 are integrated with one or more of processors 502 and 504.

Memory 520 is connected to chipset 510 via a memory interface 522. An example of memory interface 522 includes a Double Data Rate (DDR) memory channel and memory 520 represents one or more DDR Dual In-Line Memory Modules (DIMMs). In a particular embodiment, memory interface 522 represents two or more DDR channels. In another embodiment, one or more of processors 502 and 504 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 520 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 530 is connected to chipset 510 via a graphics interface 532 and provides a video display output 536 to a video display 534. An example of a graphics interface 532 includes a Peripheral Component Interconnect-Express (PCIe) interface and graphics adapter 530 can include a four-lane (x4) PCIe adapter, an eight-lane (x8) PCIe adapter, a 16-lane (x16) PCIe adapter, or another configuration, as needed or desired. In a particular embodiment, graphics adapter 530 is provided down on a system printed circuit board (PCB). Video display output 536 can include a Digital Video Interface (DVI), a High-Definition Multimedia Interface (HDMI), a DisplayPort interface, or the like, and video display 534 can include a monitor, a smart television, an embedded display such as a laptop computer display, or the like.

NVRAM 540, disk controller 550, and I/O interface 570 are connected to chipset 510 via an I/O channel 512. An example of I/O channel 512 includes one or more point-to-point PCIe links between chipset 510 and each of NVRAM 540, disk controller 550, and I/O interface 570. Chipset 110 can also include one or more other I/O interfaces, including a PCIe interface, an Industry Standard Architecture (ISA) interface, a Small Computer Serial Interface (SCSI) interface, an Inter-Integrated Circuit (I2C) interface, a System Packet Interface, a Universal Serial Bus (USB), another interface, or a combination thereof. NVRAM 540 includes BIOS/EFI module 542 that stores machine-executable code (BIOS/EFI code) that operates to detect the resources of information handling system 500, to provide drivers for the resources, to initialize the resources, and to provide common access mechanisms for the resources. The functions and features of BIOS/EFI module 542 will be further described below.

Disk controller 550 includes a disk interface 552 that connects the disc controller to an HDD 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an institute of electrical and electronics engineers (IEEE) 1394 (Firewire) interface, a proprietary interface, or a combination thereof. Alternatively, SSD 564 can be disposed within information handling system 500.

I/O interface 570 includes a peripheral interface 572 that connects the I/O interface to add-on resource 574, to TPM 576, and to network interface 580. Peripheral interface 572 can be the same type of interface as I/O channel 512 or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral interface 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board, or add-in card disposed within information handling system 500, a device that is external to the information handling system, or a combination thereof.

Network interface 580 represents a network communication device disposed within information handling system 500, on a main circuit board of the information handling system, integrated onto another component such as chipset 510, in another suitable location, or a combination thereof. Network interface 580 includes a network channel 582 that provides an interface to devices that are external to information handling system 500. In a particular embodiment, network channel 582 is of a different type than peripheral interface 572 and network interface 580 translates information from a format suitable to the peripheral channel to a format suitable to external devices.

In a particular embodiment, network interface 580 includes a NIC or host bus adapter (HBA), and an example of network channel 582 includes an InfiniBand channel, a Fibre Channel, a Gigabit Ethernet channel, a proprietary channel architecture, or a combination thereof. In another embodiment, network interface 580 includes a wireless communication interface, and network channel 582 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 582 can be connected to an external network resource (not illustrated). The network resource can include another information handling system, a data storage system, another network, a grid management system, another suitable resource, or a combination thereof.

BMC 590 is connected to multiple elements of information handling system 500 via one or more management interface 592 to provide out of band monitoring, maintenance, and control of the elements of the information handling system. As such, BMC 590 represents a processing device different from processor 502 and processor 504, which provides various management functions for information handling system 500. For example, BMC 590 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 590 can vary considerably based on the type of information handling system. BMC 590 can operate in accordance with an Intelligent Platform Management Interface (IPMI). Examples of BMC 590 include an Integrated Dell® Remote Access Controller (iDRAC).

Management interface 592 represents one or more out-of-band communication interfaces between BMC 590 and the elements of information handling system 500, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 500, that is apart from the execution of code by processors 502 and 504 and procedures that are implemented on the information handling system in response to the executed code.

BMC 590 operates to monitor and maintain system firmware, such as code stored in BIOS/EFI module 542, option ROMs for graphics adapter 530, disk controller 550, add-on resource 574, network interface 580, or other elements of information handling system 500, as needed or desired. In particular, BMC 590 includes a network interface 594 that can be connected to a remote management system to receive firmware updates, as needed or desired. Here, BMC 590 receives the firmware updates, stores the updates to a data storage device associated with the BMC, and transfers the firmware updates to the NVRAM of the device or system that is the subject of the firmware update, thereby replacing the currently operating firmware associated with the device or system, and reboots information handling system, whereupon the device or system utilizes the updated firmware image.

BMC 590 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 590, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 590 is included on a main circuit board (such as a baseboard, a motherboard, or any combination thereof) of information handling system 500 or is integrated onto another element of the information handling system such as chipset 510, or another suitable element, as needed or desired. As such, BMC 590 can be part of an integrated circuit or a chipset within information handling system 500. An example of BMC 590 includes an iDRAC, or the like. BMC 590 may operate on a separate power plane from other resources in information handling system 500. Thus BMC 590 can communicate with the management system via network interface 594 while the resources of information handling system 500 are powered off. Here, information can be sent from the management system to BMC 590 and the information can be stored in a RAM or NVRAM associated with the BMC. Information stored in the RAM may be lost after power-down of the power plane for BMC 590, while information stored in the NVRAM may be saved through a power-down/power-up cycle of the power plane for the BMC.

Information handling system 500 can include additional components and additional busses, not shown for clarity. For example, information handling system 500 can include multiple processor cores, audio devices, and the like. While a particular arrangement of bus technologies and interconnections is illustrated for the purpose of example, one of skill will appreciate that the techniques disclosed herein are applicable to other system architectures. Information handling system 500 can include multiple central processing units (CPUs) and redundant bus controllers. One or more components can be integrated together. Information handling system 500 can include additional buses and bus protocols, for example, PC and the like. Additional components of information handling system 500 can include one or more storage devices that can store machine-executable code, one or more communications ports for communicating with external devices, and various input and output (I/O) devices, such as a keyboard, a mouse, and a video display.

For purposes of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as a processor 502, a programmable logic array (PLA), an embedded device such as a System-on-a-Chip (SoC), or other control logic hardware. Information handling system 500 can also include one or more computer-readable media for storing machine-executable code, such as software or data.

Although FIG. 2 shows example blocks of method 200 in some implementations, method 200 may include additional blocks, fewer blocks, different blocks, or differently arranged blocks than those depicted in FIG. 2. Those skilled in the art will understand that the principles presented herein may be implemented in any suitably arranged processing system. Additionally, or alternatively, two or more of the blocks of method 200 may be performed in parallel. For example, blocks 225 and 230 of method 200 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   determining, by a processor, a data activity temperature of an object for migration from a remote data storage to an on-premises data storage;
   determining a category for the object based on the data activity temperature;
   determining temperatures of a plurality of tiers of the on-premises data storage, wherein the determining of the temperatures includes determining temperature per block of each tier of the tiers of the on-premises data storage; and
   storing a file associated with the object from the remote data storage to a tier of the tiers of the on-premises data storage based on the data activity temperature of the object and the temperature per block of the tier.

2. The method of claim 1, further comprising determining a change in temperature to the tier subsequent to the storing of the file.

3. The method of claim 1, further comprising accumulating changes in temperature of the tiers of the on-premises data storage after the storing of the file.

4. The method of claim 1, further comprising applying a tier mapping policy to the object.

5. The method of claim 1, further comprising querying the remote data storage for tier information associated with the object.

6. The method of claim 5, wherein the tier information includes the data activity temperature of the object.

7. The method of claim 1, further comprising determining slice temperature of a plurality of storage slices of the tiers.

8. An information handling system, comprising:
   a memory; and
   a processor to communicate with the memory, the processor to:
      determine a data activity temperature of an object for migration from a remote data storage to an on-premises data storage;
      determine a category for the object based on the data activity temperature;
      determine temperatures of a plurality of tiers of the on-premises data storage, wherein the determination of the temperatures includes to determine temperature per block of each tier of the tiers of the on-premises data storage; and
      migrate a file associated with the object from the remote data storage to a tier of the tiers of the on-premises data storage based on the data activity temperature of the object and the temperature per block of the tier.

9. The information handling system of claim 8, wherein the processor is further configured to determine a change in temperature to the tier subsequent to the migration of the file.

10. The information handling system of claim 8, wherein the processor is further configured to accumulate changes in temperature of the tiers of the on-premises data storage after the migration of the file.

11. The information handling system of claim 8, wherein the processor is further configured to apply a tier mapping policy to the object.

12. The information handling system of claim 8, wherein the processor is further configured to query the remote data storage for tier information associated with the object.

13. The information handling system of claim 8, wherein the processor is further configured to determine a slice temperature of a plurality of storage slices of the tiers.

14. A non-transitory computer-readable medium to store instructions that are executable to perform operations comprising:
   determining a data activity temperature of a file for migration from a remote data storage to an on-premises data storage;
   determining a category for the file based on the data activity temperature;
   determining temperatures of a plurality of tiers of the on-premises data storage, wherein the determining of the temperatures includes determining temperature per block of each tier of the tiers of the on-premises data storage; and
   storing the file from the remote data storage to a tier of the tiers of the on-premises data storage based on the data activity temperature of the file and the temperature per block of the tier.

15. The non-transitory computer-readable medium of claim 14, wherein the operations further comprise determining a change in temperature to the tier subsequent to the storing of the file.

16. The non-transitory computer-readable medium of claim 14, wherein the operations further comprise accumulating changes in temperature of the tiers of the on-premises data storage after the storing of the file.

17. The non-transitory computer-readable medium of claim 14, wherein the operations further comprise applying a tier mapping policy to the file.

18. The non-transitory computer-readable medium of claim 14, wherein the operations further comprise querying the remote data storage for tier information associated with the file.

19. The non-transitory computer-readable medium of claim 18, wherein the tier information includes the data activity temperature of the file.

20. The non-transitory computer-readable medium of claim 14, wherein the operations further comprise determining slice temperature of a plurality of storage slices of the tiers.

* * * * *